(12) United States Patent
Statyev et al.

(10) Patent No.: US 11,444,967 B2
(45) Date of Patent: Sep. 13, 2022

(54) METHOD AND SYSTEM FOR IDENTIFYING MALICIOUS ACTIVITY OF PRE-DETERMINED TYPE

(71) Applicant: YANDEX EUROPE AG, Lucerne (CH)

(72) Inventors: Sergey Vyacheslavovich Statyev, Moscow (RU); Anton Olegovich Chigin, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 257 days.

(21) Appl. No.: 16/866,832

(22) Filed: May 5, 2020

(65) Prior Publication Data
US 2021/0075808 A1    Mar. 11, 2021

(30) Foreign Application Priority Data
Sep. 5, 2019    (RU) ............................ RU2019128002

(51) Int. Cl.
*H04L 9/40*    (2022.01)
*G06F 16/958*    (2019.01)
(Continued)

(52) U.S. Cl.
CPC ........ *H04L 63/1425* (2013.01); *G06F 16/215* (2019.01); *G06F 16/986* (2019.01); *G06Q 30/0185* (2013.01); *H04L 63/1466* (2013.01)

(58) Field of Classification Search
CPC .... G06F 16/215; G06F 16/957; G06F 16/986; G06F 21/57; G06F 21/577;
(Continued)

(56) References Cited

U.S. PATENT DOCUMENTS

| | | | |
|---|---|---|---|
| 7,519,562 B1 | 4/2009 | Vander et al. | |
| 7,610,276 B2 | 10/2009 | Yomtobian | |

(Continued)

FOREIGN PATENT DOCUMENTS

| | | |
|---|---|---|
| CN | 103853744 A | 6/2014 |
| RU | 2658878 C1 | 6/2018 |
| RU | 2662391 C1 | 7/2018 |

OTHER PUBLICATIONS

Chachra N, Savage S, Voelker G. Affiliate crookies: characterizing affiliate marketing abuse. Proceedings of the 2015 ACM Internet Measurement Conference (to Appear) 2015. (Year: 2015).*

(Continued)

*Primary Examiner* — Theodore C Parsons
(74) *Attorney, Agent, or Firm* — BCF LLP (57) ABSTRACT

There is disclosed a method for identifying malicious activity of a pre-determined type. The method comprises acquiring, an indication of a plurality of web resources, each of the plurality of web resources being accessible via a communication network at a respective network address; analyzing, the plurality of web resources to identify a subset of web resources being candidates for being associated with the malicious activity; executing, an automated browser application, the automated browser application being configured to: access each of the web resources within the subset of web resources; and analyzing, by the server, a log associated with the automated browser application accessing each of the web resources, the log comprising an indication of a presence of a cookie unrelated to each of the web resources; determining, for a given web resource included within the subset of web resources, a presence of malicious activity based on the log.

16 Claims, 5 Drawing Sheets

(51) Int. Cl.
*G06F 16/215* (2019.01)
*G06Q 30/00* (2012.01)

(58) Field of Classification Search
CPC . G06Q 30/0185; H04L 63/14; H04L 63/1416; H04L 63/1425; H04L 63/1466; H04L 63/168
See application file for complete search history.

(56) References Cited

U.S. PATENT DOCUMENTS

| | | | |
|---|---|---|---|
| 7,827,054 B2 | 11/2010 | Campbell et al. | |
| 7,877,800 B1 | 1/2011 | Satish et al. | |
| 8,548,917 B1* | 10/2013 | Sripracha | G06F 21/44 705/14.54 |
| 8,578,462 B2 | 11/2013 | Petrovic | |
| 8,661,299 B1 | 2/2014 | Ip | |
| 8,966,631 B2 | 2/2015 | El-Moussa et al. | |
| 9,047,628 B2 | 6/2015 | Mislove et al. | |
| 9,092,510 B1 | 7/2015 | Stets et al. | |
| 9,183,387 B1 | 11/2015 | Altman et al. | |
| 9,241,010 B1 | 1/2016 | Bennett et al. | |
| 9,349,134 B1 | 5/2016 | Adams et al. | |
| 9,479,516 B2 | 10/2016 | Mote et al. | |
| 9,652,354 B2 | 5/2017 | Filimonov et al. | |
| 9,672,242 B2 | 6/2017 | Jung et al. | |
| 9,846,896 B2 | 12/2017 | Shah et al. | |
| 9,866,566 B2 | 1/2018 | Dulkin et al. | |
| 9,870,596 B2 | 1/2018 | Babinowich et al. | |
| 10,009,358 B1 | 6/2018 | Xie et al. | |
| 10,084,816 B2 | 9/2018 | Zhang et al. | |
| 10,089,660 B2 | 10/2018 | Luan et al. | |
| 10,218,733 B1 | 2/2019 | Amidon et al. | |
| 2005/0262026 A1 | 11/2005 | Watkins et al. | |
| 2008/0162475 A1 | 7/2008 | Meggs et al. | |
| 2008/0172271 A1 | 7/2008 | Wee et al. | |
| 2008/0301090 A1 | 12/2008 | Sadagopan et al. | |
| 2008/0301811 A1 | 12/2008 | Jung | |
| 2009/0049547 A1 | 2/2009 | Fan | |
| 2009/0083184 A1 | 3/2009 | Eisen et al. | |
| 2009/0125444 A1* | 5/2009 | Cochran | G06Q 30/0185 705/50 |
| 2011/0055104 A1 | 3/2011 | Sun et al. | |
| 2011/0208714 A1 | 8/2011 | Soukal et al. | |
| 2012/0101952 A1* | 4/2012 | Raleigh | H04L 12/1417 709/223 |
| 2012/0233692 A1 | 10/2012 | Oh et al. | |
| 2013/0332468 A1 | 12/2013 | Hardas et al. | |
| 2014/0114877 A1 | 4/2014 | Montano | |
| 2014/0214570 A1 | 7/2014 | Smolev et al. | |
| 2015/0205862 A1 | 7/2015 | Campagne et al. | |
| 2015/0264073 A1 | 9/2015 | Tavakoli et al. | |
| 2015/0326674 A1 | 11/2015 | Kruglick et al. | |
| 2015/0341383 A1 | 11/2015 | Reddy et al. | |
| 2016/0065600 A1 | 3/2016 | Lee et al. | |
| 2016/0196566 A1 | 7/2016 | Murali et al. | |
| 2016/0259742 A1 | 9/2016 | Faulkner et al. | |
| 2016/0321711 A1 | 11/2016 | Wouhaybi et al. | |
| 2016/0323307 A1* | 11/2016 | Savant | H04L 63/1425 |
| 2017/0220971 A1 | 8/2017 | Giammaria et al. | |
| 2017/0221111 A1 | 8/2017 | Salehi et al. | |
| 2017/0230229 A1 | 8/2017 | Sasturkar et al. | |
| 2017/0272458 A1 | 9/2017 | Muddu et al. | |
| 2017/0364949 A1* | 12/2017 | Vandusen | G06Q 30/0255 |
| 2018/0048658 A1 | 2/2018 | Hittel et al. | |
| 2018/0196684 A1 | 7/2018 | Pengfei et al. | |
| 2018/0218295 A1 | 8/2018 | Hasija et al. | |
| 2018/0278647 A1 | 9/2018 | Gabaev et al. | |
| 2018/0357683 A1 | 12/2018 | Pickover et al. | |
| 2019/0034986 A1 | 1/2019 | Robinson et al. | |
| 2019/0379700 A1 | 12/2019 | Canzanese et al. | |
| 2020/0012981 A1 | 1/2020 | Davison et al. | |
| 2020/0311309 A1 | 10/2020 | Dawer et al. | |
| 2020/0342006 A1 | 10/2020 | Rossi et al. | |

OTHER PUBLICATIONS

Peter Snyder and Chris Kanich. 2016. Characterizing fraud and its ramifications in affiliate marketing networks. J. Cybersec. 2, 1 (2016), (Year: 2016).*
Notice of Allowance dated Apr. 2, 2021 received in respect of a related U.S. Appl. No. 16/868,363.
Russian Search report dated Jul. 8, 2021 in respect of the Russian Patent Application RU 2019128002.
Office Action dated May 13, 2021 received in respect of a related U.S. Appl. No. 16/869,878.
Notice of Allowance dated Jun. 24, 2021 received in respect of a related U.S. Appl. No. 16/869,282.
"Search Engine Click Spam Detection Based on Bipartite Graph Propagation" http://www.thuir.cn/group/~YQLiu/publications/wsdm2014.pdf, published in WSDM '14 Proceedings of the 7th ACM international conference on Web search and data mining on Feb. 24, 2014, retrieved on Oct. 9, 2019.
Walgampaya "Cracking the Smart ClickBot", Conference: 13th IEEE International Symposium on Web Systems Evolution, WSE 2011, Williamsburg, VA, USA, Sep. 30, 2011 Cite this publication, DOI: 10.1109/WSE.2011.6081830 , retrieved on Oct. 9, 2019.
Yafeng "Positive Unlabeled Learning for Deceptive Reviews Detection", Wuhan University, published in Proceedings of the 2014 Conference on Empirical Methods in Natural Language Processing (EMNLP), retrieved on Oct. 9, 2019.

* cited by examiner

METHOD AND SYSTEM FOR IDENTIFYING MALICIOUS ACTIVITY OF PRE-DETERMINED TYPE

CROSS-REFERENCE

The present application claims priority to Russian Patent Application No. 2019128002, entitled "Method and System for Identifying Malicious Activity of Pre-Determined Type", filed Sep. 5, 2019, the entirety of which is incorporated herein by reference.

FIELD

The present technology generally relates to systems and methods for identifying malicious activity of a pre-determined type, and, in particular, to methods and systems for detecting cookie stuffing.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment-related information. Users use a variety of client devices (desktop, laptop, notebook, smartphone, tablets and the like) to have access to rich content (like images, audio, video, animation, and other multimedia content from such networks).

Although the underlying concept of affiliate marketing—paying rewards for referred business—predates the appearance of the Internet, it has grown with the Internet, due to its ease for the online merchants to expand visibility and for the affiliate to easily earn money.

Generally speaking, how an online affiliate program work is as follows. An affiliate runs a website that is visited by a user. The website includes a referral link, which when clicked, directs the user to a homepage or a product page of the merchant. If for example, the user buys a product from the merchant, the affiliate is rewarded (generally a percentage of the sale), for directing the user to the merchant.

In order to properly identify the entity who has referred the user to the merchant, the referral link may prompt an issuance of a cookie by the merchant to be stored within the browser application of the user. The cookie comprises a unique identifier of the affiliate. When a transaction is executed, the merchant is configured to analyze the cookie of the browser application and identify the affiliate for compensation.

Like many other fields where money is involved, affiliate marketing is susceptible to fraud by ill-intended users who attempt to improperly receive compensation from the merchant.

A notable example of such fraud is known as "cookie stuffing". Generally speaking, cookie stuffing is a technique in which the website embeds a referral link that causes a visitor to receive a cookie associated with a merchant website without the user actually accessing the merchant website (or even providing a consent to access the merchant website). When the visitor visits the merchant website afterwards and completes a transaction, the merchant website acknowledges the cookie and pays a commission to an entity that operates or controls the website for referring the visitor. Needless to say, since the website (or the entity associated with) is being paid a commission despite not having encouraged the visitor to visit the merchant website, cookie stuffing is considered to be illegitimate by operators of many affiliate schemes.

U.S. Pat. No. 7,877,800 B1 issued on Jan. 25, 2011 to Symantec Corporation, and titled "Preventing Fraudulent Misdirection of Affiliate Program Cookie Tracking", discloses a cookie monitoring manager that detects fraudulent updates to cookies on a computer. The cookie monitoring manager monitors cookies, and detects attempted write operations thereto. The cookie monitoring manager determines whether each detected attempted write operation is an attempt to write a fraudulent affiliate identifier to a cookie. The cookie monitoring manager detects fraudulent write attempts, for example, by detecting an attempt to write a known fraudulent affiliate identifier to a cookie, by detecting an attempt to write to a cookie by a process other than a browser or by detecting multiple attempts to write affiliate identifiers to a cookie within a sufficiently short period of time. When the cookie tracking manager detects an attempt to write a fraudulent affiliate identifier to a cookie, it can block the write attempt and/or run an adware removal program on the computer.

U.S. Pat. No. 9,349,134 B1 issued on May 24, 2016 to Google Inc., and titled "Detecting Illegitimate Network Traffic", discloses emulating a user web browsing session including directing a web browser installed on a computer system to visit one or more websites. The method also includes logging network traffic delivered to the computer system in response to the web browser visiting the one or more websites. In addition, the method includes identifying network traffic requested by an application installed on the computer system and delivered to the web browser in response to the web browser visiting the one or more websites.

SUMMARY

Non-limiting embodiments of the present technology have been developed based on developer's appreciation of at least one technical problem associated with the prior art solutions.

According to a broad aspect of the present technology, there is disclosed a computer implemented method for identifying malicious activity of a pre-determined type, the method being executable by a server. The method comprising: acquiring, by the server, an indication of a plurality of web resources, each of the plurality of web resources being accessible via a communication network at a respective network address; analyzing, by the server, the plurality of web resources to identify a subset of web resources being candidates for being associated with the malicious activity; executing, by the server, an automated browser application, the automated browser application being configured to: access each of the web resources within the subset of web resources; analyzing, by the server, a log associated with the automated browser application accessing each of the web resources, the log comprising an indication of a presence of a cookie unrelated to each of the web resources; and determining, for a given web resource included within the subset of web resources, a presence of malicious activity based on the log.

In some non-limiting embodiments of the method, the server is further coupled to a web service, and wherein the pre-determined type is cookie-stuffing of the cookie, the cookie being associated with the web service.

In some non-limiting embodiments of the method, the server is further coupled to an electronic device, and wherein the acquiring the plurality of web resources comprises: acquiring a navigational history from the electronic device, the navigational history comprising an indication of the plurality of web resources, each of the web resources in the plurality of web resources having been previously accessed by the electronic device.

In some non-limiting embodiments of the method, the server is further coupled to a web service, and wherein the acquiring the navigational history is executed in response to the electronic device executing a predetermined action associated with the web service.

In some non-limiting embodiments of the method, the predetermined action is one of: accessing the web service; executing a transaction on the web service; and exiting the web service.

In some non-limiting embodiments of the method, the analyzing the plurality of web resources is executed in response to determining a presence of the cookie within a memory associated with the electronic device, the cookie having been acquired prior to accessing the web service.

In some non-limiting embodiments of the method, the analyzing the plurality of web resources comprises at least one of: removing duplicate web resources within the one or more web resources; removing web resources having page views above a predetermined threshold.

In some non-limiting embodiments of the method, the automated browser application has not accessed the web service and the cookie has been assigned by virtue of the visit to a given one of the web resources within the subset of web resources.

In some non-limiting embodiments of the method, in response to the presence of the cookie within the log of the automated browser application, the method further comprises retrieving an HTML source code associated with the web service.

In some non-limiting embodiments of the method, the determining the presence of the malicious activity comprises, analyzing the HTML source code to determine a presence of a pre-determined code pattern indicative of the malicious activity.

In some non-limiting embodiments of the method, to determine the presence of the pre-determined code pattern comprises determining the presence of a cookie assigning trigger within a portion of the HTML source code.

In some non-limiting embodiments of the method, the cookie assigning trigger corresponds to a uniform resource locator including a domain name of the web service and a user identification ID, the user identification ID associated with an affiliate entity in an affiliate relationship with the web service, the user identification ID causing the storing of the cookie within the log.

In some non-limiting embodiments of the method, the portion of the HTML source code corresponds to an HTML image tag within the HTML source code.

In some non-limiting embodiments of the method, the portion of the HTML source code corresponds to an HTML iframe tag within the HTML source code.

In some non-limiting embodiments of the method, in response to determining the presence of the malicious activity the method further comprises: executing, by the server, a restrictive action against the affiliate entity.

In some non-limiting embodiments of the method, the restrictive action is one of: temporarily suspending the affiliate relationship with the affiliate entity; removing the affiliate relationship with the affiliate entity.

In some non-limiting embodiments of the method, the web service is an online marketplace web resource. In some non-limiting embodiments of the method, the HTML source code is retrieved from the log.

In accordance with another broad aspect of the present technology, there is provided a server for identifying malicious activity of a pre-determined type, the server comprising a processor configured to: acquire, an indication of a plurality of web resources, each of the plurality of web resources being accessible via a communication network at a respective network address; analyze, the plurality of web resources to identify a subset of web resources being candidates for being associated with the malicious activity; execute, an automated browser application, the automated browser application being configured to: access each of the web resources within the subset of web resources; and analyze, a log associated with the automated browser application accessing each of the web resources, the log comprising an indication of a presence of a cookie unrelated to each of the web resources; and determine for a given web resource included within the subset of web resources, a presence of malicious activity based on the log.

In some non-limiting embodiments of the server, the server is further coupled to a web service, and wherein the pre-determined type is cookie-stuffing of the cookie, the cookie being associated with the web service.

In some non-limiting embodiments of the server, the server is further coupled to an electronic device, and wherein to acquire the plurality of web resources, the processor is configured to: acquire a navigational history from the electronic device, the navigational history comprising an indication of the plurality of web resources, each of the web resources in the plurality of web resources having been previously accessed by the electronic device.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
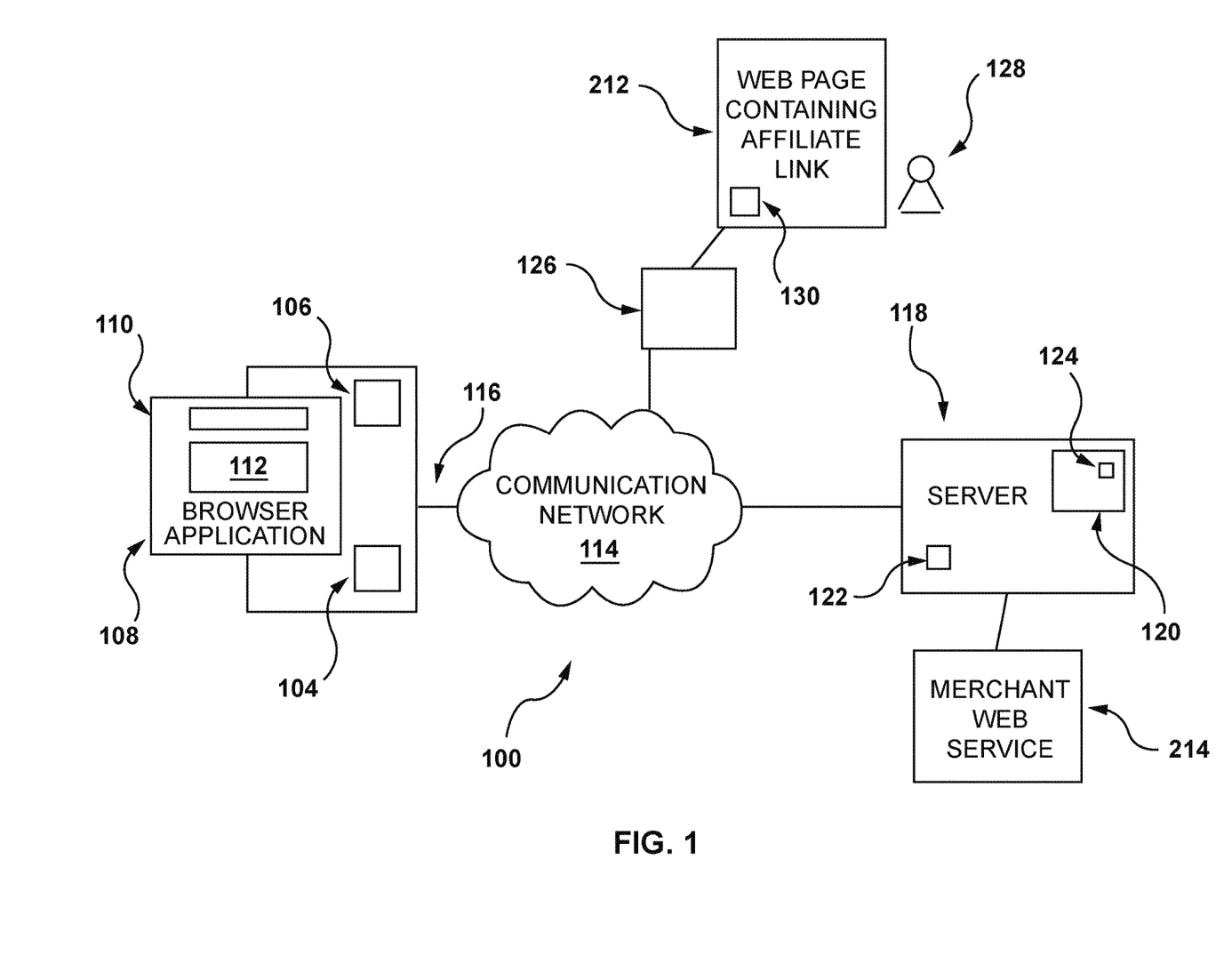
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art to execute a browser application 108. Generally speaking, the purpose of the browser application 108 is to enable the user (not depicted) to access one or more web resources. The manner in which the browser application 108 is implemented is known in the art and will not be described herein. Suffice it to say that the browser application 108 may be one of Google™ Chrome™ browser, Yandex.Browser™ browser, or other commercial or proprietary browsers.

Irrespective of how the browser application 108 is implemented, the browser application 108, typically, has a command interface 110 and a browsing interface 112. Generally speaking, the user (not depicted) can access a web resource via a communication network by two principle means. The given user can access a particular web resource directly, either by typing an address of the web resource (typically an URL or Universal Resource Locator, such as www.example.com) into the command interface 110 or by clicking a link in an e-mail or in another web resource (which action will in a sense "copy and paste" the URL associated with the link into the command interface 110).

Alternatively, the given user may conduct a search using a search engine service (not depicted) to locate a resource of interest based on the user's search intent. The latter is particularly suitable in those circumstances, where the given user knows a topic of interest, but does not know the URL of the web resource she is interested in. The search engine typically returns a Search Engine Result Page (SERP) containing links to one or more web resources that are responsive to the user query. Again, upon the user clicking one or more links provided within the SERP, the user can open the required web resource.

The electronic device 102 comprises a communication interface (not depicted) for two-way communication with a communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 116 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 116 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116 and the communication network 114. As such, by no means the examples provided hereinabove are meant to limit the scope of the present technology.

The system 100 further includes a server 118 coupled to the communication network 114. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the electronic device 102 and other devices potentially coupled to the communication network 114). Similar to the electronic device 102, the server 118 comprises a server memory 120 which comprises one or more storage media and generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some embodiments, the server 118 can be operated by the same entity that has provided the afore-described browser application 108. For example, if the browser application 108 is a Yandex.Browser™ browser, the server 118 can be operated by Yandex LLC of Lev Tolstoy Street, No. 16, Moscow, 119021, Russia. In alternative embodiments, the server 118 can be operated by an entity different from the one who has provided the afore-mentioned browser application 108.

In accordance with the present technology, the server 118 provides an online merchant web service 214 (such as eBay™ service, Amazon™ service, Yandex.Market™ service), which is accessible by the electronic device 102 by typing the URL of a web portal or a web page that hosts the e-commerce service into the command interface 110 of the browser application 108 (or clicking a hyperlink associated therewith).

In some non-limiting embodiments of the present technology, there is further provided a web server 126 coupled to the communication network 114. How the web server 126 is implemented is not limited, and may for example be implemented in the same manner as the server 118.

In some non-limiting embodiments of the present technology, the web server 126 is configured to host a web page 212. Needless to say, although a single web page is shown as being hosted by the web server 126, it is not limited as such and it is contemplated that more than one web page be hosted by the web server.

How the web page 212 is implemented is not limited. For example, the web page 212 may be a personal blog or a personal web page associated with an entity 128, which may correspond to an individual, or to a business.

In some non-limiting embodiments of the present technology, the entity 128 is in an affiliate relationship with the online merchant web service 214. In other words, the online merchant web service 214 rewards the entity 128 for each visitor or customer brought by the marketing efforts of the entity 128.

Generally speaking, when the entity 128 enters into an affiliate relationship with any given e-commerce service, such as the online merchant web service 214, a unique affiliate ID is assigned to the entity 128 (for example "548425"). The entity 128 then generates (or receives) an affiliate link 130, which is made up of the URL of the online merchant web service 214 and the unique affiliate ID (for example, www.abcde.com/548425).

The affiliate link 130 is then included within the web page 212 by the entity 128. How the affiliate link 130 is included into the web page 212 is not limited, and may for example be implemented as a hyperlink, an ad, a banner and the like.

Figure 2:
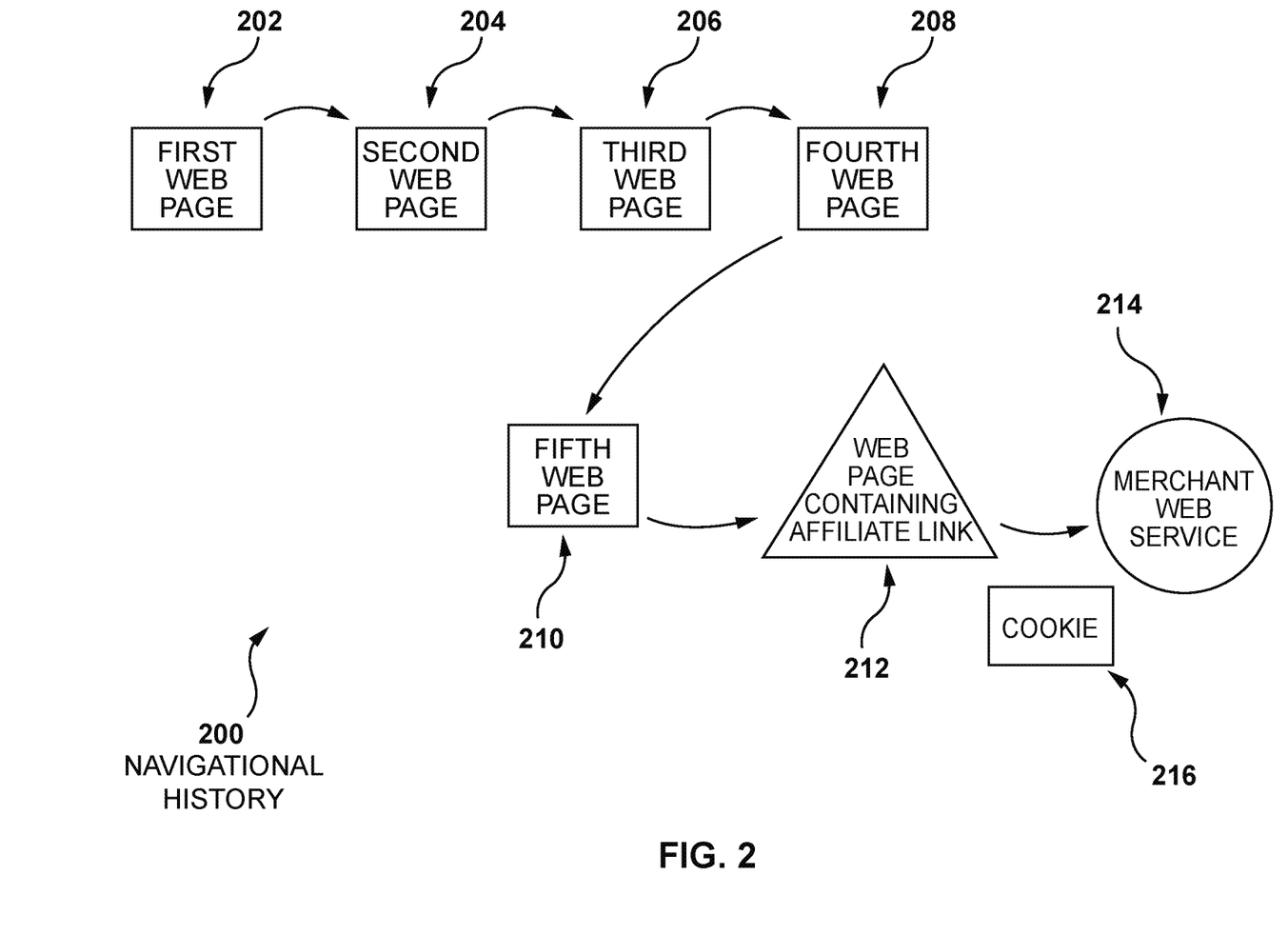
FIG. 2 depicts a schematic flow of a navigational history illustrating an affiliate marketing relationship.

Referring to FIG. 2, there is depicted a schematic flow of a navigational history illustrating an affiliate marketing relationship.

Let us assume, that FIG. 2 depicts a schematic flow of a navigational history 200 associated with the browser application 108. The navigational history 200 includes the web pages it has accessed prior to accessing the online merchant web service 214.

The navigational history 200 is indicative of the browser application 108 having accessed 6 (six) web pages before accessing the online merchant web service 214. Within the six web pages, there is provided a first web page 202, a second web page 204, a third web page 206, a fourth web page 208 and a fifth web page 210 and the web page 212, accessed chronologically (illustrated by the arrows).

Generally speaking, when the user associated with the browser application 108 clicks on the affiliate link 130 (see FIG. 1), the browser application 108 is transferred to the online merchant web service 214, which will cause the server 118 to generate and assign a cookie 216 to the electronic device 102. The cookie 216 includes an indication of the unique affiliate ID, and in response to the user concluding a transaction on the online merchant web service 214 within a pre-determined time interval from the moment in time when the cookie 216 is assigned (such as, for example, a week, two weeks, a month, or the like), the server 118 acquires the cookie 216 from the browser application 108 and causes an agreed-upon reward to be transmitted to the referring entity.

Although in the above explanation, the reward is transmitted following the conclusion of a transaction on the online merchant web service 214, it is not limited as such.

For example, the online merchant web service 214 may pay the reward to the entity 128 in response to the entity 128 causing the browser application 108 to visit the online merchant web service 214 (i.e. prior to a transaction having been completed using the online merchant web service 214).

In another example, the online merchant web service 214 may pay the reward to the entity 128 in response to the entity 128 causing the browser application 108 to visit the online merchant web service 214 and clicking a particular type of link on it. Indeed, it is contemplated that the online merchant web service 214 is a platform where vendors (such as individuals or businesses) can advertise products or services. Interested users that choose an advertised product or service are redirected to a website of the vendor, where the actual transaction occurs. As such, when the browser application 108 is redirected to the website of the vendor, the online merchant web service 214 may transmit the reward to the entity 128.

Figure 3:
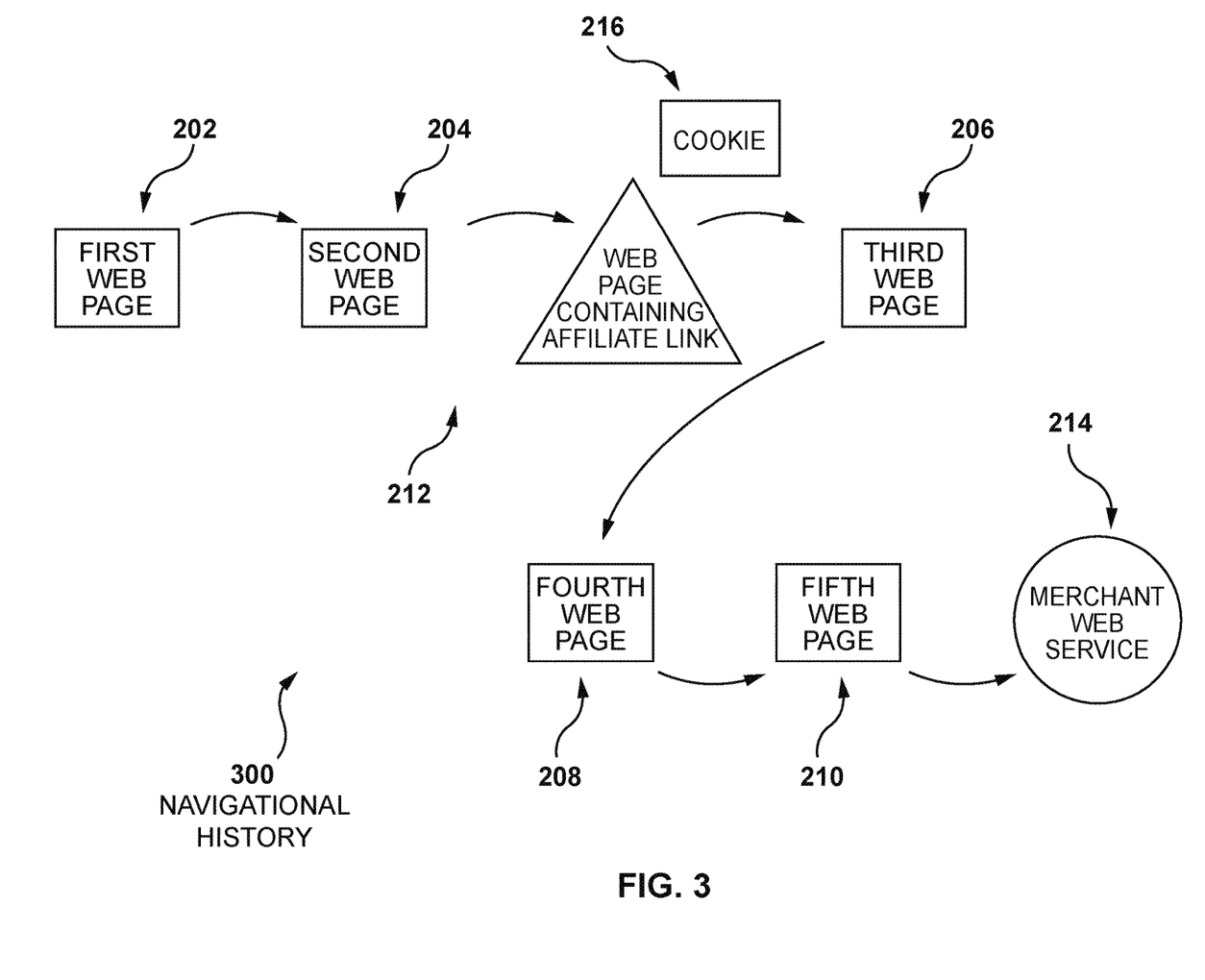
FIG. 3 depicts a schematic flow of a navigational history with an instance of cookie stuffing.

Referring to FIG. 3, there is depicted a schematic flow of a navigational history with an instance of cookie stuffing.

As illustrated in FIG. 3, it is shown that the browser application 108 has visited, in a chronological order, the first web page 202, the second web page 204 the web page 212, the third web page 206, the fourth web page 208, the fifth web page 210, and the online merchant web service 214. In other words, unlike as illustrated by the navigational history 200, the browser application 108 has not accessed the online merchant web service 214 right after the web page 212.

However, as illustrated, the browser application 108 has acquired the cookie 216 after having accessed the web page 212 without having accessed the online merchant web service 214. In other words, without having accessed the online merchant web service 214, the web page 212 has caused the cookie 216 to be stored onto the browser application 108—this is referred to as cookie stuffing.

How the cookie stuffing is implemented by the web page 212 is not limited. For example, the web page 212 may include an <img> HTML tag where the image source code is replaced with the affiliate link 130. For example, recalling that the affiliate link corresponds to www.abcde.com/548425, the image tag would correspond to <img src="www.abcde.com/548425">.

When loading the web page 212, the browser application 108 will follow the affiliate link 130, but instead of loading an image, it will receive the cookie 216 from the server 118 (see FIG. 2). In other words the browser application 108 will store the cookie 216 despite having not accessed the online merchant web service 214. In another example, instead of the <img> HTML tag, the affiliate link 130 may be included in the <iframe> HTML tag.

Needless to say, other means of cookie stuffing is contemplated. For example, it is also contemplated that the web page 212 comprises the affiliate link 130 loaded into a banner ad, which causes the cookie 213 to be stored within the browser application 108 when loading the web page. 212.

In yet another example, cookie stuffing may be carried out by using Adobe Flash™ software, where a user is forced to visit the online merchant web service 214 when loading the web page 212.

Now, if for example, the browser application 108 eventually accesses the online merchant web service 214 and executes a transaction, the server 118 (see FIG. 1) will retrieve the cookie 216 and compensate the affiliate, despite the fact that the web page 212 has not actually referred the browser application 108 to the online merchant web service 214.

Needless to say, since the web page 212 has not actually encouraged the browser application 108 to visit the online merchant web service 214, this technique is considered illegitimate by many affiliate schemes.

Returning to FIG. 1, the server 118 is configured to execute an authentication application 124. In some non-limiting embodiments of the present technology, the authentication application 124 is configured to determine if the browser application 108 that is accessing the online merchant web service 214 has been the subject of cookie stuffing.

Although the description of the system 100 has been made with reference to various hardware entities (such as the server 118, electronic device 102, the web server 126) depicted separately, it should be understood that this is done for ease of understanding. It is contemplated that the various functions executed by these various entities be executed by a single entity or be distributed among different entities.

Figure 4:
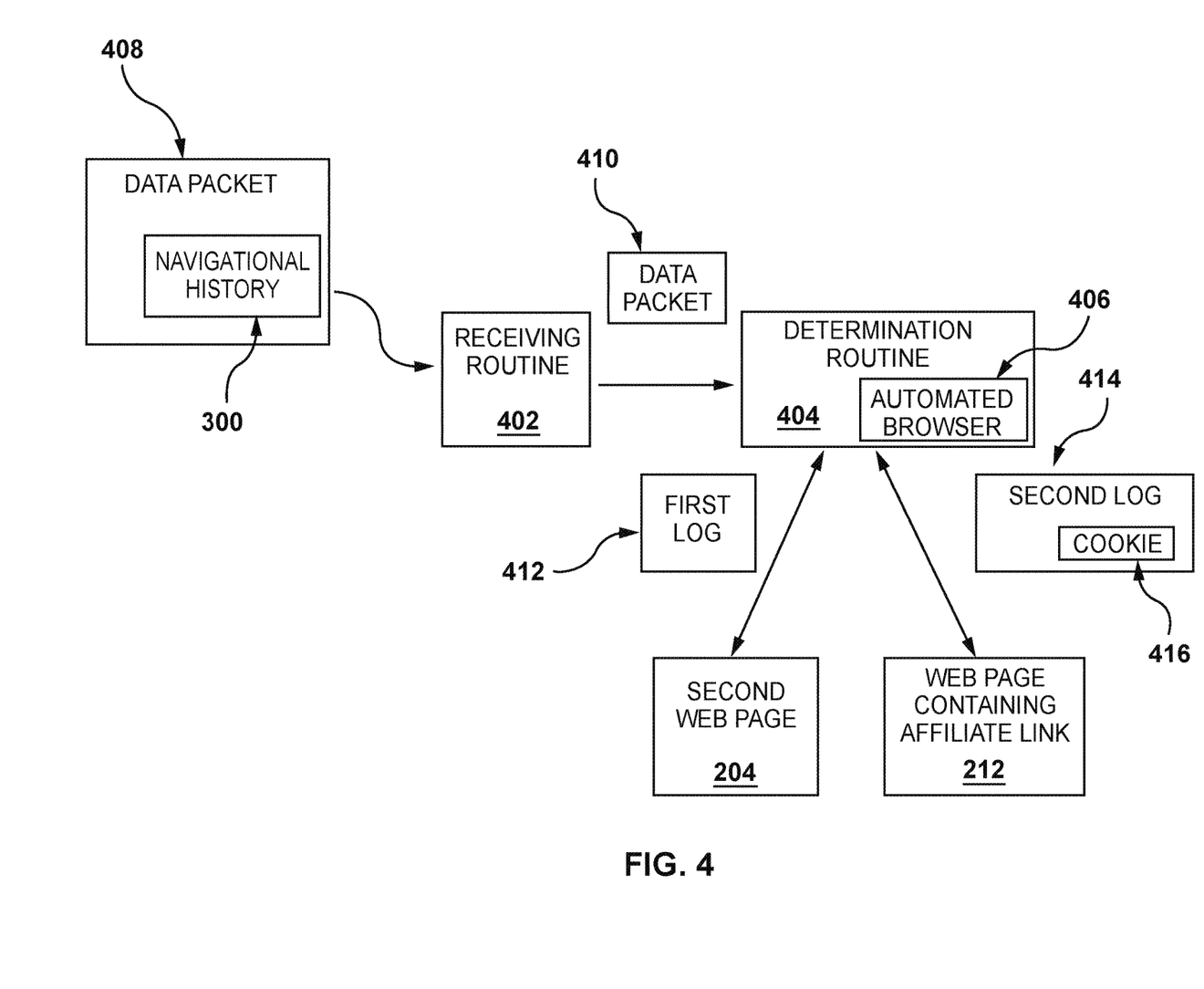
FIG. 4 depicts a schematic diagram of a process for detecting cookie stuffing.

With reference to FIG. 4, there is depicted a schematic diagram of a process for detecting cookie stuffing. The process for detecting cookie stuffing is executed by the authentication application 124 (see FIG. 1) implemented in accordance with a non-limiting embodiment of the present technology. The authentication application 124 executes (or otherwise has access to): a receiving routine 402, and a determination routine 404.

In the context of the present specification, the term "routine" refers to a subset of the computer executable program instructions of the authentication application 124 that is executable by the server processor 122 (the receiving routine 402, the determination routine 404). For the avoidance of any doubt, it should be expressly understood that the receiving routine 402, the determination routine 404 are illustrated herein as separate entities for ease of explanation of the process executed by the authentication application 124. It is contemplated that some or all of the receiving routine 402, the determination routine 404 may be implemented as one or more combined routines.

For ease of understanding the present technology, functionality of each of the receiving routine 402, the determination routine 404, as well as data and/or stored therein are described below.

Receiving Routine 402

The receiving routine 402 is configured to receive a data packet 408 from the electronic device 102. Let us assume that the data packet 308 includes the navigational history 300 (see FIG. 3).

In some non-limiting embodiments of the present technology, the data packet 308 is transmitted to the receiving routine 402 in response to a predetermined action. For example, the predetermined action may correspond to the electronic device 102 (i) accessing the online merchant web service 214; (ii) executing a transaction on the online merchant web service 214; and (iii) being directed from the online merchant web service 214 to another commerce's web page.

In some non-limiting embodiments of the present technology, instead of receiving the data packet 408 from the electronic device 102, the navigational history 300 may be obtained using a web analytic application (not illustrated), such as Yandex.Metrica™ application. How the navigational history 300 may be obtained using the web analytic application is not limited, and may for example be done using the technology described in a co-owned U.S. Patent Application entitled "METHOD AND SYSTEM FOR DETECTION POTENTIAL SPAM ACTIVITY DURING ACCOUNT REGISTRATION" and bearing application Ser. No. 15/893,824, filed on Feb. 12, 2018 by the same applicant, and incorporated herein by reference in its entirety. Needless to say, other methods for obtaining the navigational history 300 could also be used.

Thus, it can be said that in various non-limiting embodiments of the present technology, the navigational history 300 is received from the electronic device 102 (via the data packet 308) or the web analytic application (not illustrated), in response to the electronic device 102 meeting a condition.

For example, the condition may correspond to the electronic device 102 having a cookie associated with the online merchant web service 214 when the electronic device 102 is accessing the online merchant web service 214. In other words, if the electronic device 102 did not have the cookie when it has accessed the online merchant web service 214, the electronic device 102 has not been subject to cookie stuffing, and therefore the navigational history 300 associated with the electronic device 102 is not retrieved by the receiving routine 402.

Now, in response to receiving the data packet 408, the receiving routine 402 is configured to execute the following functions.

First, the receiving routine 402 is configured to analyze the navigational history 300 and select one or more suspicious web pages based on the analysis of the navigational history 300. In other words, the receiving routine 402 is configured to select one or more web pages within the navigational history 300 that may be causing cookie stuffing.

How the one or more suspicious web pages are determined is not limited. In some non-limiting embodiments of the present technology, the receiving routine 402 is configured to apply one or more rules to the navigational history 300 and/or each of the web pages included within the navigational history 300 (i.e. the first web page 202, the second web page 204, the third web page 206, the fourth web page 208, the fifth web page 210 and the web page 212).

For example, the receiving routine 402 is configured to remove popular web pages. For example, the receiving routine 402 may have access to a list of popular websites, such as Alexa Rank™, and is configured to discard web pages of the navigational history 300 included, for example, within the top 50 popular websites. Needless to say, it is contemplated that the threshold can be different.

In another example, the receiving routine 402 is configured to remove duplicate web pages within the navigational history 300. Just as an illustration, if we assume that the first web page 202 and the fourth web page 208 is the same (i.e. they have the same URL), the receiving routine 402 is configured to remove one of the first web page 202 or the fourth web page 208 from the navigational history 300.

In yet another example, instead of removing duplicate web pages within the navigational history 300, it is contemplated that the receiving routine 402 is configured to remove web pages having the same domain name.

Let us assume, for the purpose of explanation, that within the navigational history 300, the first web page 202, the third web page 206, the fourth web page 208 and the fifth web page 210 has been removed.

The receiving routine 402 is then configured to transmit a data packet 410 to the determination routine 404. The data packet 410 comprises the web pages that have not been removed within the navigational history 300, or in other words, that have been considered to be suspicious (i.e. the second web page 204 and the web page 212—which web pages can also be thought of as cookie stuffing source candidates).

Determination Routine 404

In response to receiving the data packet 410, the determination routine 404 is configured to execute the following functions.

In some non-limiting embodiments of the present technology, the determination routine 404 is configured to execute an automated browser application 406. The automated browser application 406 corresponds to a software capable of mimicking a human controlled browser application (such as the browser application 108) and accessing each of the web pages included within the data packet 410 (i.e. the second web page 204 and the web page 212). Needless to say, it is also contemplated that the automated browser application 406 instead be a conventional browser application controlled by a human user.

The determination routine 404 is configured to cause the automated browser application 406 to access the second web page 204 and the web page 212.

In some non-limiting embodiments of the present technology, for each access to the second web page 204 and the web page 212, the automated browser application 406 is configured to store one or more parameters with each of the second web page 204 and the web page 212 within a respective log.

For example, the automated browser application 406 is configured to store one or more parameters with the second web page 204 within a first log 412, and store one or more parameters with the web page 212 within a second log 414.

In some non-limiting embodiments of the present technology, the one or more parameters stored within the first log 412 may include a parameter indicative of a presence of one or more cookies having been assigned to the automated browser application 406 after visiting the second web page 204, and/or a HTML source code of the second web page 204. Similarly, the one or more parameters stored within the second log 414 may include a parameter indicative of the presence of one or more cookies having been assigned to the automated browser application 406 after visiting the web page 212, and/or the HTML source code of the web page 212.

Now, the determination routine 404 is configured to determine if the one or more cookies included within each of the first log 412 and the second log 414 is a cookie that is associated with the online merchant web service 214. In other words, the determination routine 404 is configured to determine if the automated browser application 406 has received a cookie associated with the online merchant web service 214 by simply accessing the second web page 204 or the web page 212. Indeed, it is contemplated that since the automated browser application 406 has not accessed the online merchant web service 214, if a cookie associated with the online merchant web service 214 has been stored into by the automated browser application 406, it is indicative that cookie stuffing has occurred.

How the determination is made is not limited. For example, the server 118 (see FIG. 1) may be coupled to a cookie database (not shown) which stores an indication of the cookies created and assigned by the server 118 for the online merchant web service 214, together with an indication of a respective unique affiliate ID (if any). As such, the determination routine 404 is configured to determine if one of the one or more cookies has been created by the server 118.

Needless to say, it is also contemplated that the determination routine 404 is configured to analyze the one or more cookies to identify the presence of any unique affiliate ID (based on the cookie database) within the one or more cookies.

If none of the one or more cookies stored within the first log 412 is associated with the online merchant web service 214, the determination routine 404 is configured to determine that the second web page 204 is not associated with a cookie stuffing scheme.

On the other hand, let us assume that a cookie 416 that is stored within the second log 414 is associated with the online merchant web service 214. As such, the determination routine 404 is configured to determine that the web page 212 is associated with a cookie stuffing scheme, since it has received the cookie 416 without having visited the online merchant web service 214.

In some non-limiting embodiments of the present technology, the determination routine 404 is configured to identify the unique affiliate ID that is associated with the cookie 416 by accessing the cookie database, and execute a restrictive action against the entity associated with the identified unique affiliate ID.

For example, let us assume that the identified unique affiliate ID is associated with the entity 128 (see FIG. 1). The determination routine 404 is configured to execute a restrictive action which may be one of: (i) temporarily suspending the affiliate relationship with the entity 128; and (ii) removing the entity 128 as an affiliate of the online merchant web service 214.

In some non-limiting embodiments of the present technology, in addition to identifying the presence of the cookie 416, the determination routine 404 is further configured to determine a presence of a pre-determined code pattern indicative of cookie stuffing within the HTML source code of the web page 212. More precisely, the determination routine 404 is configured to determine a cookie assigning trigger within a portion of the HTML source code of the web page 212, which causes the cookie 416 to be assigned to the automated browser application 406.

In some non-limiting embodiments of the present technology, the cookie assigning trigger includes the domain name that is associated with the online merchant web service 214 and a trigger that causes the server 118 to issue the cookie 416. For example, recalling that the entity 128 is associated with the unique affiliate ID, the trigger may correspond to the unique affiliate ID.

As has been discussed briefly above, the cookie assigning trigger may be included in the portion of the HTML source code that corresponds to the <iframe> tag and/or the <img> tag.

As such, when analyzing these HTML tags of the HTML source code, the determination routine 404 is configured to verify the presence of cookie assigning trigger therein. If the cookie assigning trigger is included within the HTML source code, the determination routine 404 is configured to extract the unique affiliate ID from the cookie assigning trigger and execute the restrictive action against the entity associated with the extracted unique affiliate ID.

Figure 5:
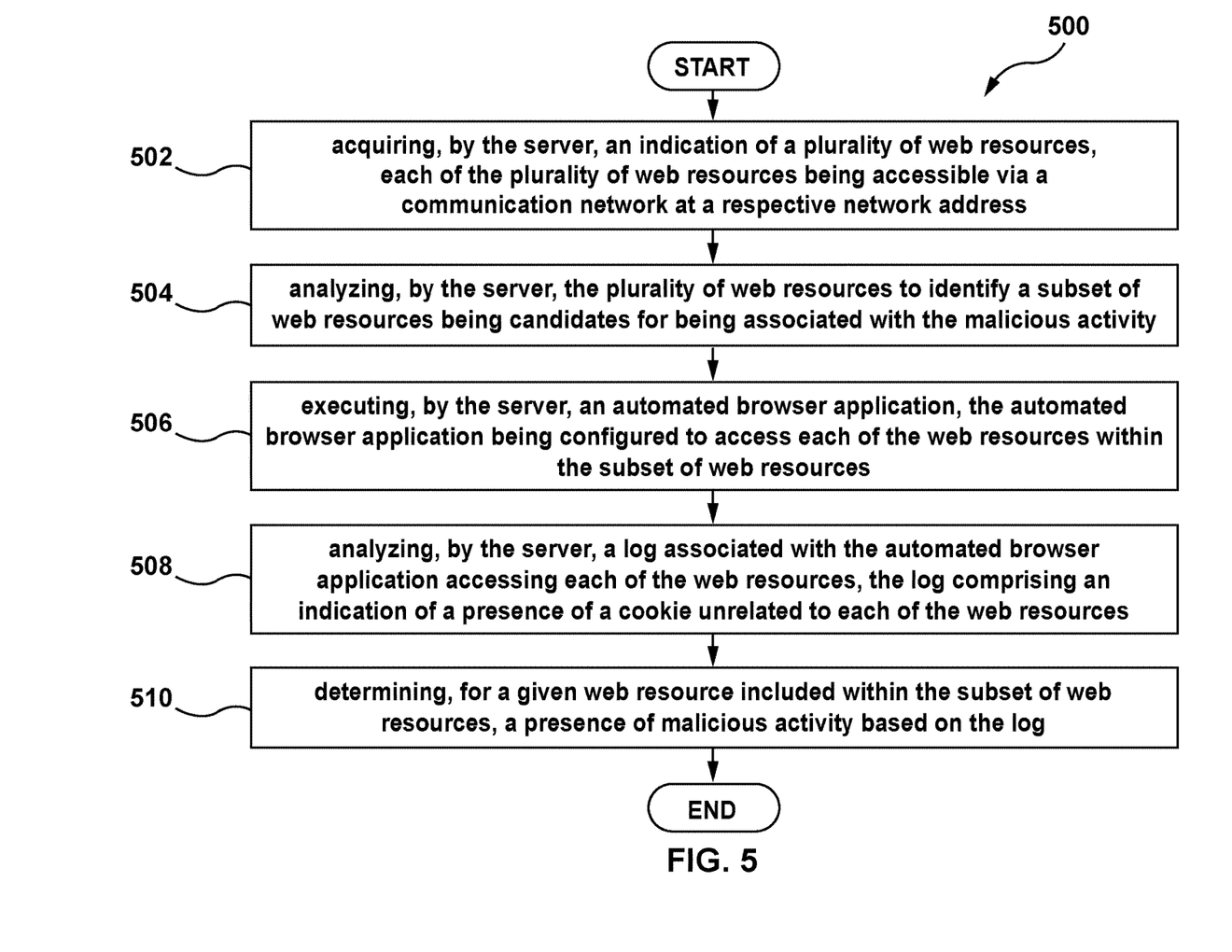
FIG. 5 depicts a block diagram of a flow chart of a method for detecting cookie stuffing.

Given the architecture and examples provided hereinabove, it is possible to execute a computer-implemented method of determining a fraudulent access to a web resource. With reference to FIG. 5, there is depicted a flow chart of a method 500, the method 500 being executable in accordance with non-limiting embodiments of the present technology. The method 500 can be executed by the server 118.

Step 502—acquiring, by the server, an indication of a plurality of web resources, each of the plurality of web resources being accessible via a communication network at a respective network address.

The method 500 starts at step 502, where the receiving routine 402 receives the data packet 408 including the navigational history 300 of the electronic device 102.

The navigational history 300 is indicative that the browser application 108 has visited, in a chronological order, the first web page 202, the second web page 204 the web page 212, the third web page 206, the fourth web page 208, the fifth web page 210 and the online merchant web service 214. In other words, unlike the navigational history 200, the browser application 108 has not accessed the online merchant web service 214 right after the web page 212.

Step 504: analyzing, by the server, the plurality of web resources to identify a subset of web resources being candidates for being associated with the malicious activity.

At step 504, the receiving routine 402 is configured to analyze the navigational history 300 and select one or more suspicious web pages. In other words, the receiving routine 402 is configured to select one or more web pages within the navigational history 300 that may be causing cookie stuffing.

How the one or more suspicious web pages are determined is not limited. In some non-limiting embodiments of the present technology, the receiving routine 402 is configured to apply one or more rules to the navigational history 300 and/or each of the web pages included within the navigational history 300 (i.e. the first web page 202, the second web page 204, the third web page 206, the fourth web page 208, the fifth web page 210 and the web page 212).

Let us assume, for the purpose of explanation, that within the navigational history 300, the first web page 202, the third web page 206, the fourth web page 208 and the fifth web page 210 has been removed.

The receiving routine 402 is then configured to transmit a data packet 410 to the determination routine 404. The data packet 410 comprises the web pages that have not been removed within the navigational history 300 (i.e. the second web page 204 and the web page 212).

Step 506: executing, by the server, an automated browser application, the automated browser application being configured to access each of the web resources within the subset of web resources.

At step 506, in response to receiving the data packet 410, the determination routine 404 is configured to execute the automated browser application 406. The automated browser application 406 corresponds to a software capable of mimicking a human controlled browser application (such as the browser application 108) and accessing each of the web pages included within the data packet 410 (i.e. the second web page 204 and the web page 212). Needless to say, it is also contemplated that the automated browser application 406 instead be a conventional browser application controlled by a human user.

The determination routine 404 is configured to cause the automated browser application 406 to access the second web page 204 and the web page 212.

In some non-limiting embodiments of the present technology, for each access to the second web page 204 and the web page 212, the automated browser application 406 is configured to store one or more parameters with each of the second web page 204 and the web page 212 within a respective log.

For example, the automated browser application 406 is configured to store one or more parameters within the second web page 204 within a first log 412, and store one or more parameters within the web page 212 within a second log 414.

Step 508: analyzing, by the server, a log associated with the automated browser application accessing each of the web resources, the log comprising an indication of a presence of a cookie unrelated to each of the web resources.

At step 508, the determination routine 404 is configured to analyze the first log 412 and the second log 414.

In some non-limiting embodiments of the present technology, the one or more interactions stored within the first log 412 may include an indication of a presence of one or more cookies having been assigned to the automated browser application 406 after visiting the second web page 204, and/or a HTML source code of the second web page 204. Similarly, the one or more interactions stored within the second log 414 may include the indication of the presence of one or more cookies having been assigned to the automated browser application 406 after visiting the web page 212, and/or the HTML source code of the web page 212.

Step 510: determining, for a given web resource included within the subset of web resources, a presence of malicious activity based on the log.

At step 510, the determination routine 404 is configured to determine if the one or more cookies included within each of the first log 412 and the second log 414 is a cookie that is associated with the online merchant web service 214. In other words, the determination routine 404 is configured to determine if the automated browser application 406 has received a cookie associated with the online merchant web service 214 just accessing the second web page 204 or the web page 212.

Let us assume for example that the none of the one or more cookies stored within the first log 412 is associated with the online merchant web service 214, and as such, the determination routine 404 is configured to determine that the second web page 204 is not associated with a cookie stuffing scheme.

On the other hand, let us assume that a cookie 416 that is stored within the second log 414 is associated with the online merchant web service 214. As such, the determination routine 404 is configured to determine that the web page 212 is associated with a cookie stuffing scheme, since it has received the cookie 416 without having visited the online merchant web service 214.

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

We claim:

1. A computer implemented method for identifying malicious activity of a pre-determined type, the pre-determined type being cookie-stuffing of a cookie, the method being executable by a server, the server being couplable to a web service and an electronic device, the cookie being associated with the web service, the method comprising:
   acquiring, by the server, a navigational history from the electronic device, the navigational history comprising an indication of a plurality of web resources, each of the web resources in the plurality of web resources having been previously accessed by the electronic device;
   in response to determining a presence of the cookie within a memory associated with the electronic device, the cookie having been acquired prior to accessing the web service, analyzing, by the server, the plurality of web resources to identify a subset of web resources being candidates for being associated with the malicious activity;

executing, by the server, an automated browser application, the automated browser application being configured to:
- access each of the web resources within the subset of web resources; and
- analyze, by the server, a log associated with the automated browser application accessing each of the web resources, the log comprising an indication of a presence of a cookie unrelated to each of the web resources; and
- determine, for a given web resource included within the subset of web resources, a presence of malicious activity based on the log.

2. The method of claim 1, wherein the acquiring the navigational history is executed in response to the electronic device executing a predetermined action associated with the web service.

3. The method of claim 2, wherein the predetermined action is one of:
- accessing the web service;
- executing a transaction on the web service; and
- exiting the web service.

4. The method of claim 1, wherein the analyzing the plurality of web resources comprises at least one of:
- removing duplicate web resources within the one or more web resources;
- removing web resources having page views above a predetermined threshold.

5. The method of claim 1, wherein the automated browser application has not accessed the web service and the cookie has been assigned by virtue of the visit to a given one of the web resources within the subset of web resources.

6. The method of claim 5, wherein in response to the presence of the cookie within the log of the automated browser application, the method further comprises retrieving an HTML source code of a one of the plurality of web resources associated with the web service.

7. The method of claim 6, wherein the determining the presence of the malicious activity comprises, analyzing the HTML source code to determine a presence of a pre-determined code pattern indicative of the malicious activity.

8. The method of claim 7, wherein to determine the presence of the pre-determined code pattern comprises determining the presence of a cookie assigning trigger within a portion of the HTML source code.

9. The method of claim 8, wherein the cookie assigning trigger corresponds to a uniform resource locator including a domain name of the web service and a user identification ID, the user identification ID associated with an affiliate entity in an affiliate relationship with the web service, the user identification ID causing the storing of the cookie within the log.

10. The method of claim 9, wherein the portion of the HTML source code corresponds to an HTML image tag within the HTML source code.

11. The method of claim 9, wherein the portion of the HTML source code corresponds to an HTML iframe tag within the HTML source code.

12. The method of claim 9, wherein in response to determining the presence of the malicious activity, the method further comprises:
- executing, by the server, a restrictive action against the affiliate entity.

13. The method of claim 12, wherein the restrictive action is one of:
- temporarily suspending the affiliate relationship with the affiliate entity;
- removing the affiliate relationship with the affiliate entity.

14. The method of claim 1, wherein the web service is an online marketplace web resource.

15. The method of claim 6, wherein the HTML, source code is retrieved from the log.

16. A hardware server for identifying malicious activity of a pre-determined type, the pre-determined type being cookie-stuffing of a cookie, the hardware server being couplable to a web service and an electronic device, the cookie being associated with the web service, the hardware server comprising a hardware processor configured to:
- acquire a navigational history from the electronic device, the navigational history comprising an indication of a plurality of web resources, each of the web resources in the plurality of web resources having been previously accessed by the electronic device;
- in response to determining a presence of the cookie within a memory associated with the electronic device, the cookie having been acquired prior to accessing the web service, analyze, the plurality of web resources to identify a subset of web resources being candidates for being associated with the malicious activity;
- execute, an automated browser application, the automated browser application being configured to:
  - access each of the web resources within the subset of web resources; and
  - analyze a log associated with the automated browser application accessing each of the web resources, the log comprising an indication of a presence of a cookie unrelated to each of the web resources; and
- determine for a given web resource included within the subset of web resources, a presence of malicious activity based on the log.

* * * * *